(12) United States Patent
Costello et al.

(10) Patent No.: US 7,191,056 B2
(45) Date of Patent: Mar. 13, 2007

(54) PRECISION LANDMARK-AIDED NAVIGATION

(75) Inventors: Michael J. Costello, Hermosa Beach, CA (US); Roy Castro, Burbank, CA (US)

(73) Assignee: The Boeing Company, Chicago, IL (US)

( * ) Notice: Subject to any disclaimer, the term of this patent is extended or adjusted under 35 U.S.C. 154(b) by 137 days.

(21) Appl. No.: 11/028,932

(22) Filed: Jan. 4, 2005

(65) Prior Publication Data

US 2006/0149458 A1 Jul. 6, 2006

(51) Int. Cl.
*G01C 21/30* (2006.01)

(52) U.S. Cl. ............................ 701/200; 348/117

(58) Field of Classification Search .................. None
See application file for complete search history.

(56) References Cited

U.S. PATENT DOCUMENTS

| | | | | |
|---|---|---|---|---|
| 4,179,693 A | * | 12/1979 | Evans et al. | 342/64 |
| 4,602,336 A | * | 7/1986 | Brown | 701/223 |
| 5,072,396 A | * | 12/1991 | Fitzpatrick et al. | 701/217 |
| 5,208,757 A | * | 5/1993 | Appriou et al. | 701/223 |
| 5,525,883 A | * | 6/1996 | Avitzour | 318/587 |
| 5,699,444 A | * | 12/1997 | Palm | 382/106 |
| 5,719,773 A | * | 2/1998 | Choate | 701/223 |
| 6,442,476 B1 | * | 8/2002 | Poropat | 701/207 |
| 6,453,223 B1 | * | 9/2002 | Kelly et al. | 701/28 |
| 6,744,397 B1 | | 6/2004 | Hager et al. | |

OTHER PUBLICATIONS

Hayet et al.; Visual landmarks detection and recognition for mobile robot navigation; Jun. 2003; Computer Vision and Pattern Recognition, 2003; IEEEE; vol. 2, pp. II-313 to II-318.*

* cited by examiner

*Primary Examiner*—Michael J. Zanelli
(74) *Attorney, Agent, or Firm*—MacPherson Kwok Chen & Heid LLP; David S. Park

(57) ABSTRACT

Navigational systems and methods are disclosed herein to provide accurate processing of two-dimensional sensor images for navigation and determination of position in three-dimensions. Landmark features are extracted from two-dimensional sensor images and correlated to landmark features data stored in a database to estimate latitude, longitude, and altitude of a vehicle or missile.

38 Claims, 2 Drawing Sheets

PRECISION LANDMARK-AIDED NAVIGATION

TECHNICAL FIELD

The present invention relates generally to guidance systems and methods and, more particularly, to guidance systems and methods for missiles, maneuvering re-entry vehicles (MaRVs), cruise missiles, and unmanned aerial vehicles (UAVs).

BACKGROUND

Increased accuracy for vehicle navigation, missile guidance, and precise targeting, is in high demand by manufacturers and governments alike.

Radar devices, such as a precision terrain-aided navigation (PTAN) radar system, in conjunction with digital terrain elevation maps which provide stored latitude, longitude, and elevation data for a given area or terrain, have been previously utilized to determine a vehicle position and assist navigation. Similar sensors for missile guidance systems, such as and lasar radars (ladars), that are capable of mapping in three dimensions, may be used in determining a missile position.

However, certain terminal sensors, such as visible (optical) and infrared imagers, provide only two-dimensional sensor images. These sensors are incapable of determining terrain elevation data and thus cannot be employed in a scheme, such as PTAN, that matches stored terrain elevation data to sensor data.

As a result, there is a need for systems and methods for processing two-dimensional sensor data to accurately determine position and aid in navigation.

SUMMARY

Systems and methods are disclosed herein to provide accurate processing of two-dimensional (2-D) sensor images for navigation and determination of position in three-dimensions (3-D) for flying vehicles such as MaRVs, cruise missiles, and unmanned aerial vehicles (UAVs). For example, in accordance with an embodiment of the present invention, landmark features, such as roads, rivers, coastlines, and buildings, are extracted from two-dimensional sensor images and correlated to landmark features data stored in a database via pattern recognition techniques to thereby estimate latitude, longitude, and altitude of the vehicle.

More specifically, in accordance with one embodiment of the present invention, a method of navigation is provided, comprising processing imagery to extract a first set of landmark features with a first extraction algorithm, processing imagery from an image sensor with a second extraction algorithm to extract a second set of landmark features, and correlating the second set of landmark features to the first set of landmark features to estimate a location of the image sensor.

In accordance with another embodiment of the present invention, a method of navigation is provided, comprising selecting a target aimpoint, processing pre-existing imagery to extract a first set of landmark features with a first extraction algorithm, providing a landmark feature database including the first set of landmark features, and processing imagery from an in-flight image sensor with a second extraction algorithm to extract a second set of landmark features. The method further includes correlating the second set of landmark features to the landmark feature database to estimate a latitude, longitude, and altitude of the image sensor.

In accordance with yet another embodiment of the present invention, a method of navigation is disclosed, comprising providing a database, processing two-dimensional image data from an airborne sensor, comparing the two-dimensional image data to the database, and determining a three-dimensional location corresponding to the two-dimensional image data.

In accordance with yet another embodiment of the present invention, a navigation system is provided, comprising a database including a first set of landmark features extracted from pre-existing imagery, an image sensor to provide in-flight imagery, and a processor operably coupled to the database and the image sensor. The processor is operable to process imagery from the image sensor to extract a second set of landmark features, and to correlate the second set of landmark features to the first set of landmark features to estimate a location of the image sensor.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
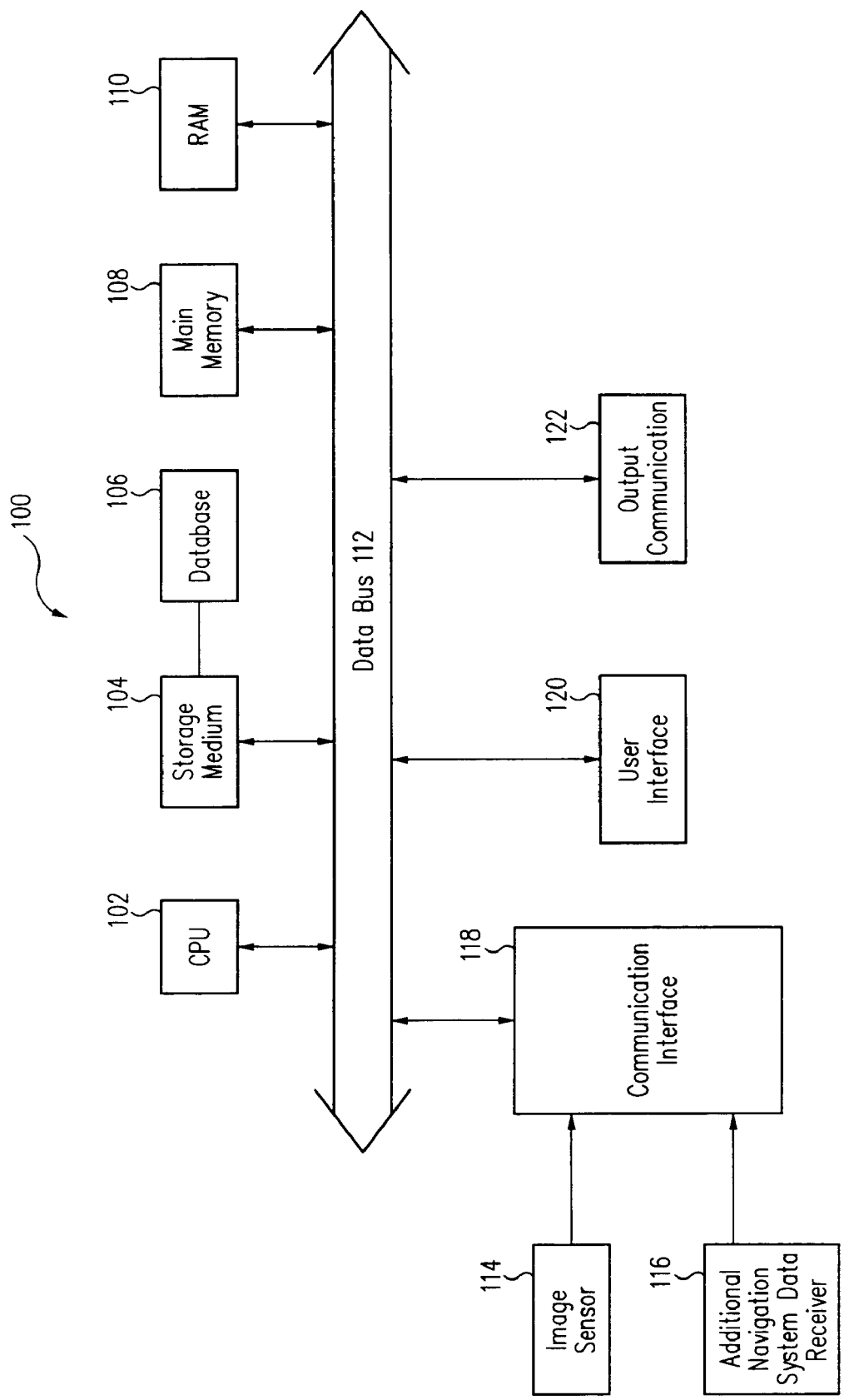
FIG. 1 shows a block diagram illustrating a navigation system for processing two-dimensional sensor images in accordance with an embodiment of the present invention.

Embodiments of the present invention and their advantages are best understood by referring to the detailed description that follows. It should be appreciated that like reference numerals are used to identify like elements illustrated in one or more of the figures. It is also noted that the figures are not necessarily drawn to scale.

DETAILED DESCRIPTION

FIG. 1 shows a block diagram illustrating a navigation system 100 that processes two-dimensional sensor images in accordance with an embodiment of the present invention. System 100 includes a central processing unit (CPU) 102, a storage medium 104 including a database 106, read-only memory (ROM) 108, and random access memory (RAM) 110, each element operably coupled to a data bus 112. An image sensor 114 is also operably coupled to data bus 112 via a communication interface 118. System 100 may further include a user interface 120 and an output communicator 122 operably coupled to data bus 112.

Image sensor 114 provides data, including but not limited to two-dimensional sensor images for navigation of a missile system, to other elements of system 100 through communication interface 118. Image sensor 114 may include a digital camera, a visible (optical) imager, and/or an infrared imager. Image sensor 114 may also include other means for providing digital images and/or means for converting images to digital images.

Optionally, an additional navigation system data receiver 116 may also provide data from other navigation devices to system 100 through communication interface 118. Additional navigation system data receiver 116 may receive data from navigation devices such as a global positioning system (GPS) using a satellite-based navigation system, a direction sensor, and/or other sensors for providing navigational data. In one embodiment, communication interface 118 is also a communication link between system 100 and a remote base station (not shown).

Data through communication interface 118 is transmitted to CPU 102, which may perform multiple functions, including but not limited to calibration, signal processing, image processing, correlation, and/or guidance functions.

Landmark feature database 106 stored in storage medium 104 includes extracted objects and features from pre-existing imagery, taken from a previous survey in one example. Database 106 comprises positional data, such as latitude and longitude coordinates, to describe landmark feature positions. Database 106 may further comprise other data representing identification and characteristics of the landmark features, including but not limited to range-dependent data such as size, length, width, and volume, and range-independent data such as color, perimeter squared over area, length over width, and shape. In a further example, database 106 may further include modeling information, map information, and image sensor information. Storage medium 104 may comprise non-volatile memory, a hard disk drive, CD-ROM, or an integrated circuit in which digitized landmark feature information has been stored. Other types of storage media are within the scope of the present invention.

Software for directing the operation of system 100 may be stored in main memory 108 for execution by CPU 102. Memory 108 may comprise any of a wide variety of non-volatile memory such as, for example, read-only memory (ROM), reprogrammable non-volatile memory such as flash memory or SRAM, CD ROM, optical disk, or PCMCIA cards. System random access memory (RAM) 110 permits reading and writing of the information necessary to execute such software programs.

Input and output means of system 100 include a user interface 120 and an output communicator 122, respectively. The user may input data, such as a target aimpoint, through user interface 120. User interface 120 may be in a remote location from the vehicle or missile in one embodiment. Output communicator 122 receives data processed by CPU 102 and may transmit vehicle location data to vehicle navigation means and/or to the remote base station (not shown).

Figure 2:
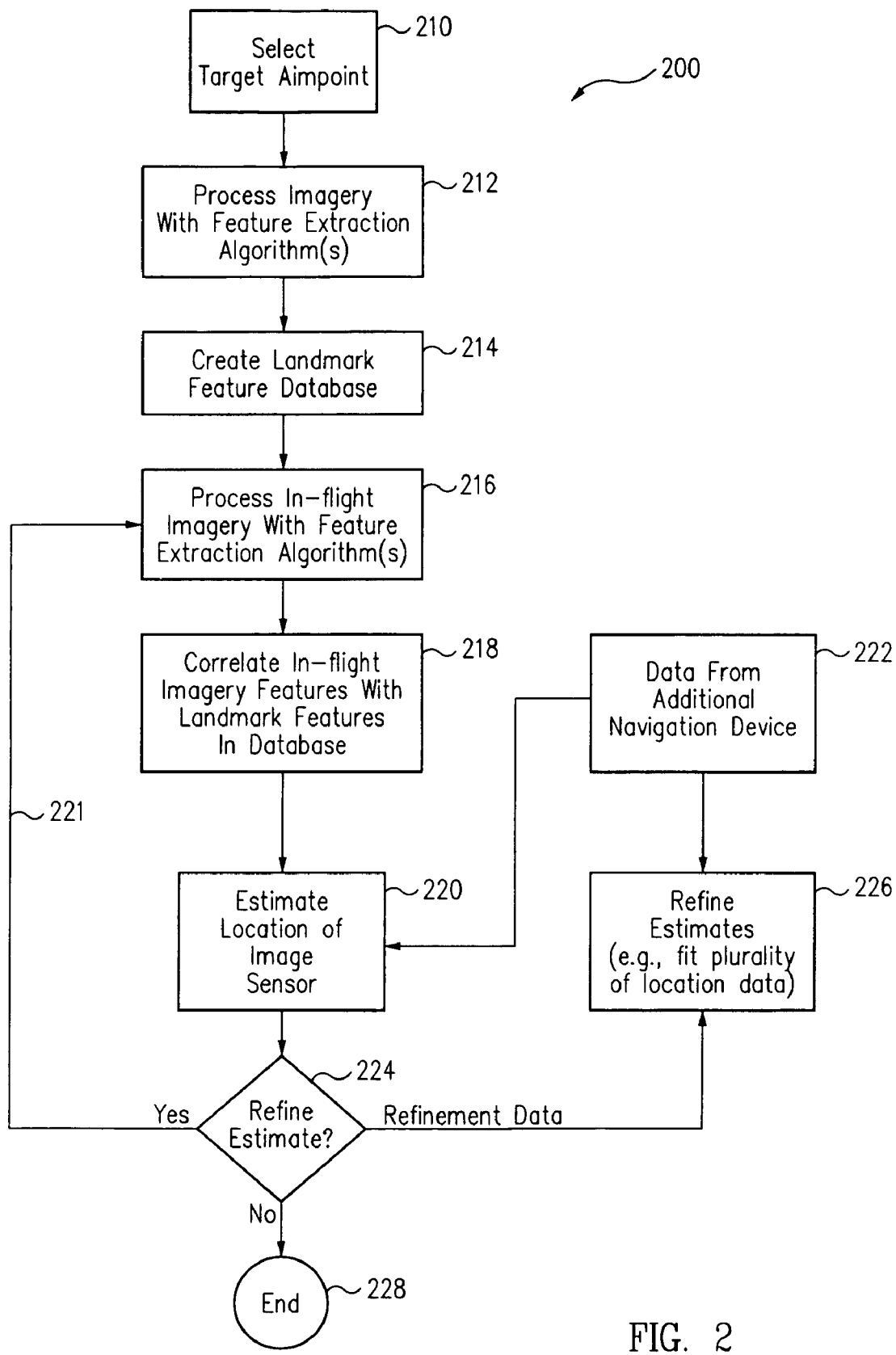
FIG. 2 shows a flowchart illustrating a method of navigation by processing two-dimensional sensor images in accordance with another embodiment of the present invention.

A method of navigation in accordance with an embodiment of the present invention will now be discussed in greater detail with reference to both FIGS. 1 and 2. FIG. 2 shows a flowchart illustrating a method of navigation 200 by processing two-dimensional sensor images.

A target aimpoint is selected in step 210, and in one embodiment may be entered via user interface 120.

Imagery, from various sources, of an intended area of operation (AOO) is then processed by a feature extraction algorithm or algorithms, as shown in step 212. Various techniques, such as contrast enhancement or cellular automata for linear or circular features, can be used to identify and extract features, including but not limited to roads, rivers, coastlines, and buildings.

Landmark features may be extracted from imagery through the use of various known techniques, alone or in combination, such as "cellular automata", "contrast enhancement", and/or the Modified Iterated Hough Transform (MIHT) useful in finding "linear" (one-dimensional) features, such as coastlines, rivers, roadways, canyon, or crater rims. "Areal" (two-dimensional) features such as buildings, lakes and reservoirs, and forests, are usually found by examining various thresholds on intensity or color (when color imagery is available) or by looking at linear features that form closed boundaries. Different extraction techniques may also be available for different landmarks.

To be useful, each extracted feature must have a "point" associated with it. For linear features, points can be extracted from intersections of various linear features (e.g., a river and a road) or from bends, loops, or bifurcations (e.g., a river with an island shows a bifurcation—the stream divides to go around the island) in the linear feature. For areal features the point assigned is usually the centroid of the area. Each point is then identified by its location, for example, its latitude, longitude, and altitude.

Identified landmark features extracted from existing imagery are then used to create a database, as shown in step 214. The identified features populate a database, such as database 106, which is stored in a memory, such as storage medium 104. Such a landmark feature database is then used for subsequent comparison with in-flight sensor data obtained during vehicle/missile flight (step 218).

The landmark database, hereinafter also referred to as the landmark "correspondence point" data set, includes information to identify correspondences between existing imagery and imagery obtained from the vehicle's imaging sensor. In one example, the database can include but is not limited to a cataloging number or name, the correspondence point location (e.g., latitude, longitude, and altitude), and the feature type (feature "primitive"—an image element from which more complicated images can be constructed) or technique used to extract the feature. A set of vectors pointing to the nearest neighboring features may also be included in one embodiment.

The two-dimensional (2-D) sensor images during vehicle flight are processed by the same or substantially similar algorithm(s) used to extract features used to populate the landmark feature database, as shown in step 216. In operation, in-flight imagery from the vehicle's sensor is subjected to the same or substantially similar type of feature extraction as was performed to identify features in the imagery used for the correspondence point data set. However, the location of each correspondence point from the in-flight imagery is not known.

The features extracted from the sensor images in step 216 are then compared with and correlated to the stored landmark feature database to determine the position of the vehicle and/or the vehicle's position relative to the intended target aimpoint, as shown in step 218.

By examining, correlating, and associating the correspondence points from the in-flight imagery with the correspondence points in the database, a registration of the two images may be made based on similarity measures, which include but are not limited to a maximum likelihood estimate considering identification items such as the feature primitives and vectors to the nearest neighbors, and/or a correlation function, which correlates pieces of the vehicle imagery with pieces of the original imagery near each correspondence point. Registration by correlation function requires that the imagery be transformed to a common viewpoint, scale, and orientation, or the correlation may be quite complex requiring either large processing power or processing time. However, the MIHT method reduces the need for image transformation to a common view. Once the registration is made, the location information (e.g., latitude, longitude, and altitude) from the correspondence point data set may be identified with the feature points extracted from the vehicle's in-flight imagery.

Then, as shown in step 220, the viewpoint from which the image was taken can be estimated using the ordinary trigonometric calculations of projective geometry (e.g., utilizing scale and orientation of the landmark features) knowing the locations of the various features extracted from the in-flight imagery. This viewpoint estimate may include the location (e.g., latitude, longitude, and altitude) and view angles (azimuth or compass angle and elevation or depression angle) of the image sensor. Accordingly, a 3-D projection based on 2-D images is provided by perspective transformation in accordance with an embodiment of the present invention.

Next, a decision may be made to either refine the viewpoint estimate or not, as shown by decision block 224. If no, the process ends at step 228. If yes, an estimate of position, orientation, and velocity may be refined by taking a series of images as illustrated by loop 221, and by fitting the data from the series of images to an assumed curve of location, as shown by step 226. Normally this curve will be limited to a simple $3^{rd}$ or $4^{th}$ order polynomial with terms for initial position, velocity, acceleration, and perhaps jerk, so that a plurality of images (e.g., any set of more than four images) can be used to refine the estimates of the location curve terms (e.g., position, velocity, acceleration) through a least squares fit or other estimating procedure.

Optionally, as shown by block 222, data from an additional navigation device, such as a GPS, a direction sensor, an inertial sensor, and/or other sensor, may be included with steps 220 or 226 to increase the accuracy of the estimated location terms including position, velocity, and acceleration.

Embodiments described above illustrate but do not limit the invention. It should also be understood that numerous modifications and variations are possible in accordance with the principles of the present invention. Accordingly, the scope of the invention is defined only by the following claims.

We claim:

1. A method of navigation, comprising:
   processing imagery to extract a first set of landmark features with a first extraction algorithm;
   processing imagery from an image sensor with a second extraction algorithm to extract a second set of landmark features; and
   correlating the second set of landmark features to the first set of landmark features to estimate a latitude, longitude, and altitude of the image sensor.

2. The method of claim 1, wherein the first set of landmark features includes a correspondence point location for each extracted landmark feature.

3. The method of claim 2, wherein the correspondence point location includes latitude, longitude, and altitude.

4. The method of claim 1, wherein the first set of landmark features is extracted with a plurality of extraction algorithms.

5. The method of claim 1, wherein the first set of landmark features includes a cataloging number, a name, a feature type, a technique used to extract the feature, and a set of vectors pointing to the nearest neighboring features.

6. The method of claim 1, wherein the first and the second set of landmark features includes a cataloging number, a name, a feature type, a technique used to extract the feature, and a set of vectors pointing to the nearest neighboring features.

7. The method of claim 1, wherein the second extraction algorithm is substantially similar to the first extraction algorithm.

8. The method of claim 1, wherein the second set of landmark features is extracted with a plurality of extraction algorithms.

9. The method of claim 1, further comprising estimating a velocity and acceleration of the image sensor.

10. The method of claim 1, further comprising estimating a view angle of the image sensor.

11. The method of claim 1, further comprising providing data from a navigation device to refine the estimate of the image sensor location.

12. The method of claim 1, further comprising repeatedly processing imagery from the image sensor to refine the estimate of the image sensor location.

13. The method of claim 12, further comprising fitting estimated location data from repeatedly processing imagery to an estimated location curve.

14. The method of claim 1, further comprising selecting a target aimpoint for the image sensor to navigate toward.

15. The method of claim 1, further comprising providing a landmark feature database including the first set of landmark features.

16. A method of navigation, comprising:
    processing pre-existing imagery to extract a first set of landmark features with a first extraction algorithm;
    providing a landmark feature database including the first set of landmark features;
    processing two-dimensional imagery from an in-flight image sensor with a second extraction algorithm to extract a second set of landmark features; and
    correlating the second set of landmark features to the landmark feature database to estimate a latitude, longitude, and altitude of the image sensor.

17. The method of claim 16, wherein the first set of landmark features includes a correspondence point location for each extracted landmark feature.

18. The method of claim 17, wherein the correspondence point location includes latitude, longitude, and altitude.

19. The method of claim 16, wherein the first set of landmark features is extracted with a plurality of extraction algorithms.

20. The method of claim 16, wherein the first set of landmark features includes a cataloging number, a name, a feature type, a technique used to extract the feature, and a set of vectors pointing to the nearest neighboring features.

21. The method of claim 16, wherein the first and the second set of landmark features includes a cataloging number, a name, a feature type, a technique used to extract the feature, and a set of vectors pointing to the nearest neighboring features.

22. The method of claim 16, wherein the second extraction algorithm is substantially similar to the first extraction algorithm.

23. The method of claim 16, wherein the second set of landmark features is extracted with a plurality of extraction algorithms.

24. The method of claim 16, further comprising repeatedly processing imagery from the image sensor to refine the estimate of the latitude, longitude, and altitude of the image sensor.

25. A method of navigation, comprising:
    providing a database;
    processing two-dimensional image data from an airborne sensor;

comparing the two-dimensional image data to the database; and determining a three-dimensional location of the airborne sensor based upon a comparison of the two-dimensional image data to the database, wherein the three-dimensional location includes a latitude, longitude, and altitude of the airborne sensor.

26. The method of claim 25, wherein the database includes a set of landmark features.

27. The method of claim 25, wherein the two-dimensional image is processed to identify landmark features.

28. A navigation system, comprising:
a database including a first set of landmark features extracted from pre-existing imagery;
an airborne image sensor to provide in-flight imagery; and
a processor operably coupled to the database and the image sensor, wherein the processor is operable to:
process imagery from the image sensor to extract a second set of landmark features, and
correlate the second set of landmark features to the first set of landmark features to estimate a latitude, longitude, and altitude of the image sensor.

29. The system of claim 28, wherein the database includes a correspondence point location for each extracted landmark feature.

30. The system of claim 29, wherein the correspondence point location includes latitude, longitude, and altitude.

31. The system of claim 28, wherein the database includes a cataloging number, a name, a feature type, a technique used to extract the feature, and a set of vectors pointing to the nearest neighboring features.

32. The system of claim 28, wherein the first and the second set of landmark features includes a cataloging number, a name, a feature type, a technique used to extract the feature, and a set of vectors pointing to the nearest neighboring features.

33. The system of claim 28, wherein the first and the second set of landmark features are extracted with substantially similar extraction algorithms.

34. The system of claim 28, wherein the first and the second set of landmark features are extracted with a plurality of extraction algorithms.

35. The system of claim 28, wherein the image sensor is selected from the group consisting of a camera, an optical imager, and an infrared imager.

36. The system of claim 28, wherein the processor estimates a view angle of the image sensor.

37. The system of claim 28, wherein the processor repeatedly processes imagery from the image sensor to refine the estimate of the image sensor location.

38. The system of claim 28, further comprising a navigation device for providing additional data to refine the estimate of the image sensor location.

* * * * *